United States Patent
Duan et al.

(10) Patent No.: US 10,168,879 B1
(45) Date of Patent: Jan. 1, 2019

(54) INTERACTIVE IMAGE RECOLORING

(71) Applicant: Snap Inc., Venice, CA (US)

(72) Inventors: Kun Duan, Marina del Rey, CA (US);
Yunchao Gong, Playa Vista, CA (US);
Nan Hu, San Jose, CA (US)

(73) Assignee: Snap Inc., Santa Monica, CA (US)

( * ) Notice: Subject to any disclaimer, the term of this patent is extended or adjusted under 35 U.S.C. 154(b) by 48 days.

(21) Appl. No.: 15/594,083

(22) Filed: May 12, 2017

(51) Int. Cl.
| | |
|---|---|
| *G06F 3/048* | (2013.01) |
| *G06T 7/11* | (2017.01) |
| *G06T 11/00* | (2006.01) |
| *G06T 11/20* | (2006.01) |
| *G09G 5/02* | (2006.01) |
| *G06F 3/0484* | (2013.01) |
| *G06T 7/13* | (2017.01) |

(52) U.S. Cl.
CPC ............ *G06F 3/04845* (2013.01); *G06T 7/11* (2017.01); *G06T 7/13* (2017.01); *G06T 11/001* (2013.01); *G06T 11/203* (2013.01); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 2011/0175916 A1* | 7/2011 | Noris | G06K 9/00416 345/441 |
| 2015/0248390 A1* | 9/2015 | Gormish | G06F 17/241 715/233 |
| 2015/0248740 A1* | 9/2015 | Gormish | G06F 3/04883 345/531 |
| 2015/0248760 A1* | 9/2015 | Barrus | G06F 3/04883 382/203 |

OTHER PUBLICATIONS

"Background Algorithm in a nutshell", [Online]. Retrieved fron the Internet: <URL:https://grabcut.weebly.com/background--algorithm.html>, (accessed Dec. 19, 2017), 2 pgs.
"Interactive foreground extraction using grabcut algorithm", [Online]. Retrieved from the Internet <URL:: https://docs.opencv.org/trunk/d8/d83/tutorial_py_grabcut.html>, (accessed Dec. 19, 2017), 3 pgs.

(Continued)

*Primary Examiner* — Wesner Sajous
(74) *Attorney, Agent, or Firm* — Schwegman Lundberg & Woessner, P.A.

(57) ABSTRACT

Disclosed are systems, methods, and computer-readable storage media to perform an interactive image recolorization process. The method includes receiving user input including a single stroke drawn on an image presented on a client device. The method further includes expanding the single stroke drawn on the image to generate an expanded stroke mask and refining the expanded stroke mask to determine a precise boundary that defines a region of interest on the image. The method further includes recolorizing the region of interest on the image in accordance with a user-specified color and causing presentation of a result of the recolorization on the client device.

20 Claims, 14 Drawing Sheets

(56) References Cited

OTHER PUBLICATIONS

"YCbCr", [Online]. Retrieved from the Internet:<URL:https://en.wikipedia.org/wiki/YCbCr>, (accessed Dec. 19, 2017), 4 pgs.

Levin, Anat, "Colorizaton Using Optimization", [Online]. Retrieved from the Internet:<URL:http://www.cs.huji.ac.il/~yweiss/Colorization/>, (accessed Dec. 19, 2017), 7 pgs.

Levin, A, et al., "Colorization using optimization", ACM SIGGRAPH 2004 Conf. Proc., (2004), 689-694.

Zhang, Richard, et al., "Colorful image colorization", European Conference on Computer Vision, Springer International Publishing, (2016), 1-29.

* cited by examiner

INTERACTIVE IMAGE RECOLORING

TECHNICAL FIELD

The present disclosure generally relates to the technical field of special-purpose machines for performing image recoloring, including computerized variants of such special-purpose machines and improvements to such variants, and to the technologies by which such special-purpose machines become improved compared to other special-purpose machines that perform image recoloring. In particular, the present disclosure addresses systems and methods for allowing users to interactively recolor images.

BACKGROUND

As the popularity of social networking grows, the number of digital images generated and shared using social networks grows as well. Prior to sharing such digital images on social networks, users may wish to augment the image. For example, users may wish to recolor portions of the image. Conventional methods for digitally recoloring images, also referred to as image "colorization" or "recolorization," require considerable user intervention (e.g., substantial annotation) and computational processing and are thus tedious, time-consuming, and computationally expensive tasks. Aspects of the present disclose address enhanced image recolorization techniques that may be especially optimized for deployment with mobile devices (e.g., smart phones).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products that allow a user to interactively recolor image regions. As an example, a user may use a mobile device to capture an image. Using aspects of the present disclosure, the user may draw a single scribble on or around a region of the image such as an object depicted in the image. The user may further specify one or more desired colors for the region. The system automatically swaps the original color of the region with the desired color(s) in a process referred to as "recolorization."

Consistent with some embodiments, in swapping the original color of the region, the system employs an algorithmic form of graphical model inference that takes as input an image, a mask based on the user scribble, and the user specified color. Specifically, the user scribble defines certain pixels in the input image with the desired color. Pixels inside the scribble mask (expect for the pixels of the scribble itself) are treated as unknowns, and the system uses graphical model inference to solve for them, with a constraint that neighboring pixels that have similar luminance should also be similar in color as well. Pixels outside of the scribble mask remain unchanged.

To optimize the speed of the recoloring, images are preprocessed to fine tune the single user scribble to precisely identify a boundary of a region of interest, which is used as the mask input to the graphical model inference-based recolorization process. To further automate the above process as well as minimize the user interface flow, the system may simulate additional user strokes with color.

Additionally, in some embodiments, the system performs recolorization on a downsized region of interest to optimize memory and other computational resource usage during recolorization, and the system then scales the recolorization result back to original resolution. In some instances, this process may introduce blur into the recolorization result. To solve the blurring problem, the system may combine a luminance channel of the original resolution region of interest with a color channel of the scaled region of interest to generate the final recolorization result.

Figure 1:
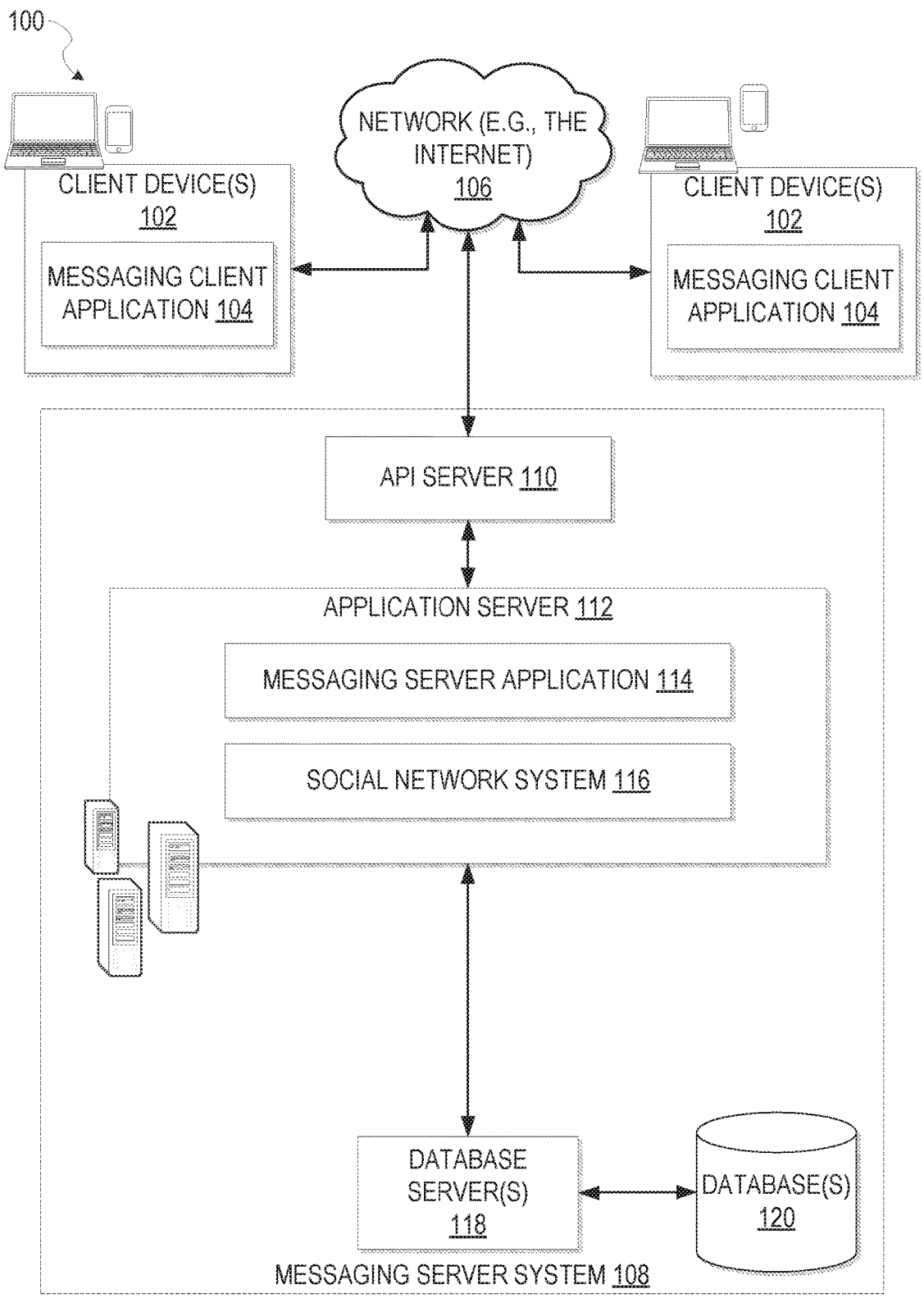
FIG. 1 is a block diagram showing an example messaging system for exchanging data (e.g., messages and associated content) over a network, according to some embodiments.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

Figure 2:
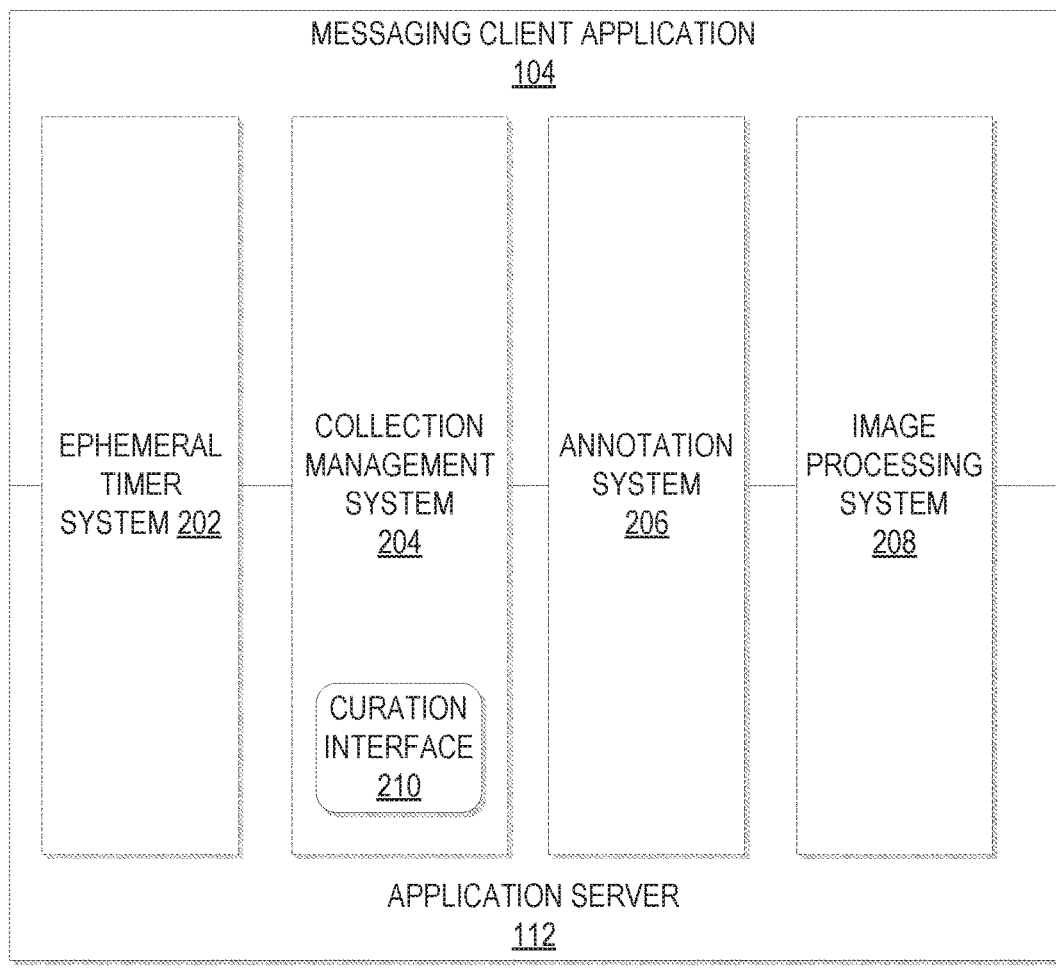
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and an image processing system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 210 that allows a collection manager to manage and curate a particular collection of content. For example, the curation interface 210 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content in a collection. In such cases, the curation interface 210 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The image processing system 208 is dedicated to performing various image processing operations, in some instances, with respect to images or video received within the payload of a message at the messaging server application 114. As an example, the image processing system 208 provides functionality to allow a user to select an object or other element in an original image to be removed and replaced using other portions of the image. Further details regarding the image processing system 208 are discussed below in reference to FIG. 4, according to some embodiments.

Figure 3:
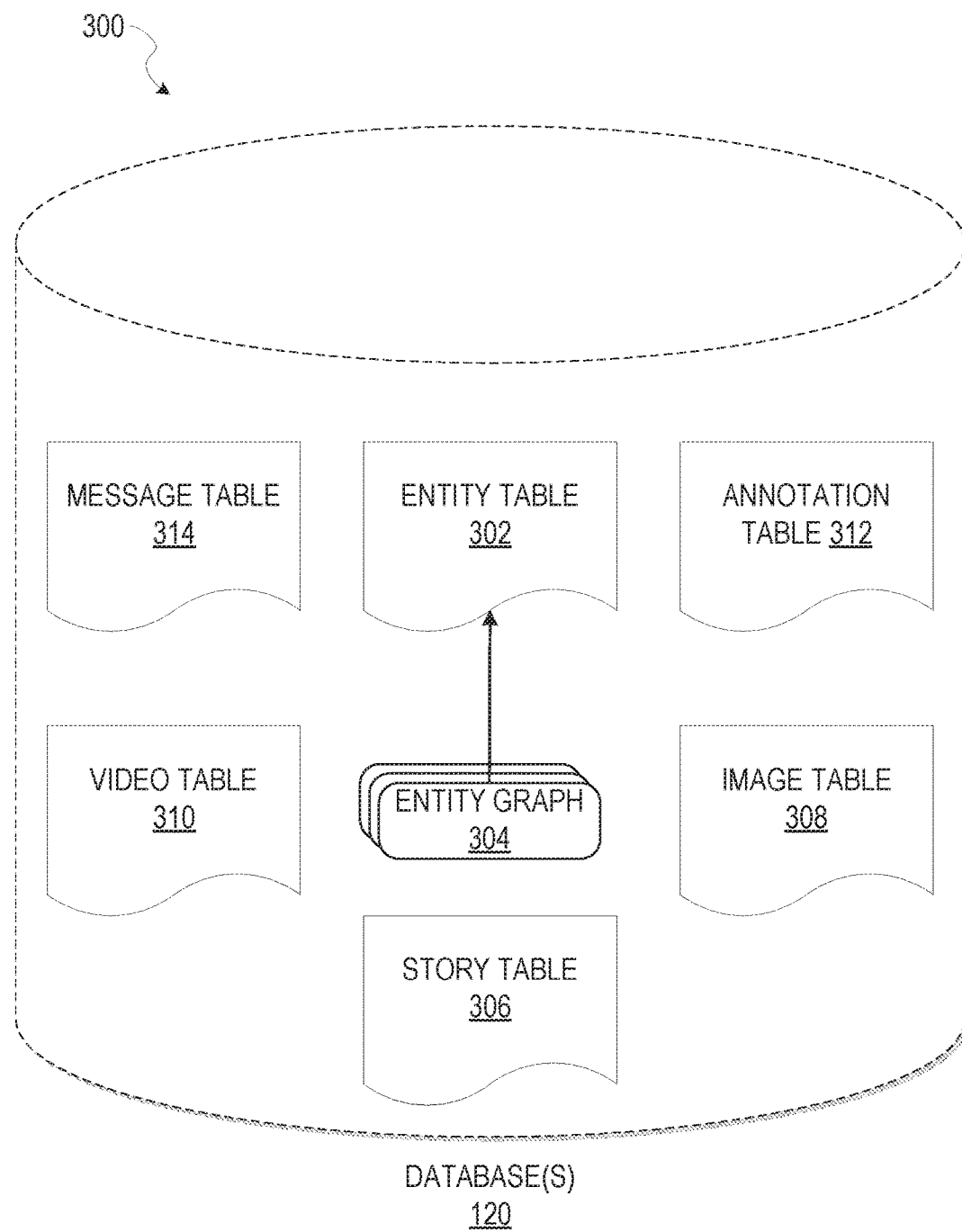
FIG. 3 is a schematic diagram illustrating data which may be stored in a database of the messaging system, according to some embodiments.

FIG. 3 is a schematic diagram 300 illustrating data which may be stored in the database 120 of the messaging server system 108, according to certain exemplary embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story." which is a collection of content from multiple users that is created manually, automatically, or using a combination of manual and automatic techniques. For example, a "live story" may constitute a curated stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
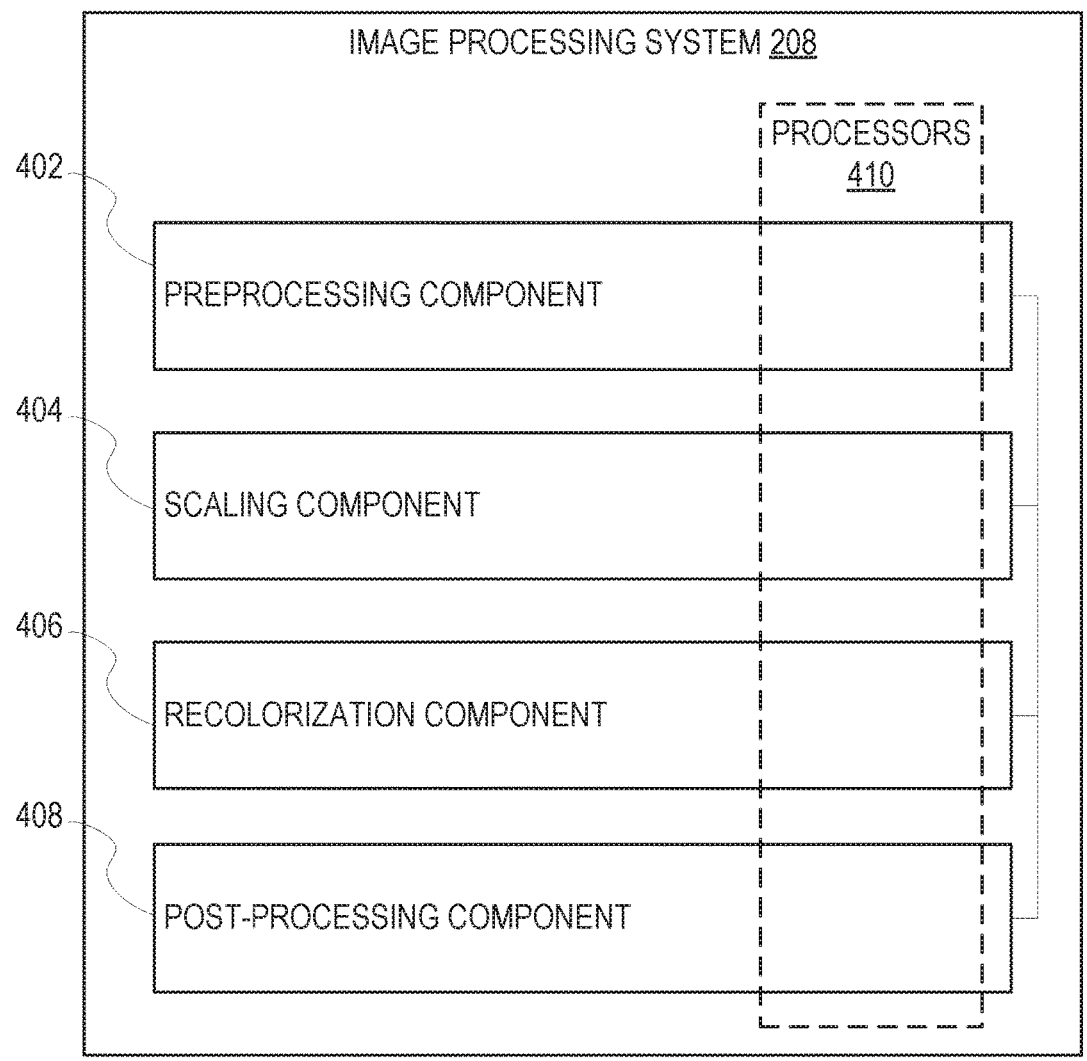
FIG. 4 is a block diagram illustrating functional components of an image processing system that forms part of the messaging system, according to some example embodiments.
Figure 5:
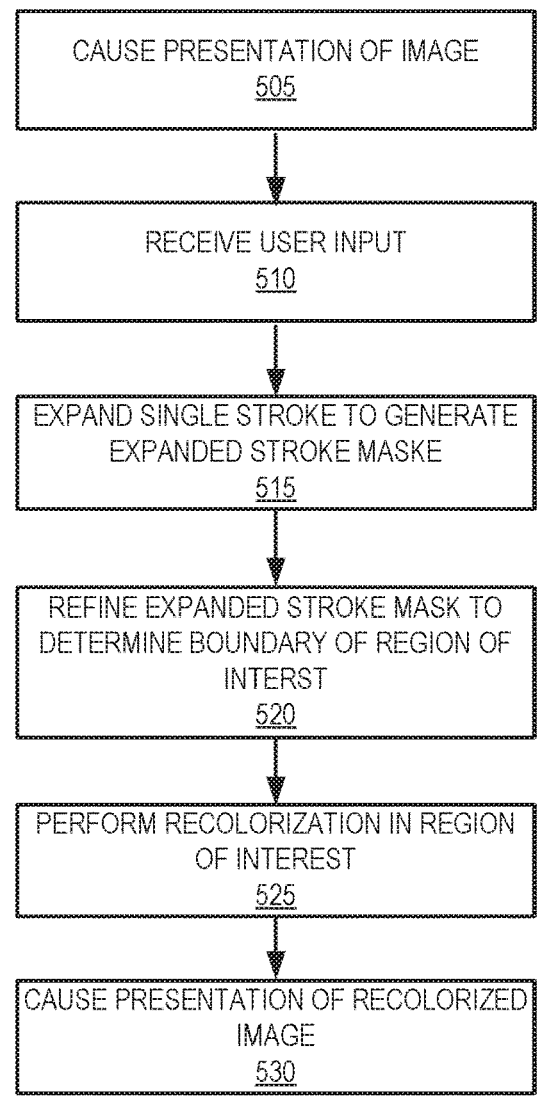
FIGS. 5-8 are flow charts illustrating operations of the image processing system in performing an example method for digital image editing, according to some embodiments.

FIG. 4 is a block diagram illustrating functional components of the image processing system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the image processing system 208 to facilitate additional functionality that is not specifically described herein. As shown, the image processing system 208 includes a preprocessing component 402, a scaling component 404, a recolorization component 406, and a post-processing component 408.

The above referenced functional components of the image processing system 208 are configured to communicate with each other (e.g., via a bus, shared memory, a switch, or APIs). Collectively, these components facilitate interactive recolorization of a region of interest in an image in accordance with a user-specified color. In other words, the preprocessing component 402, the scaling component 404, the recolorization component 406, and the post-processing component 408 work in conjunction to allow a user to select an object or other element in an original image to be recolorized, specify an alternative color for the object or other element, and replace the color of the object or other element with the alternative color specified by the user.

The preprocessing component 402 is responsible for performing various transformations to images prior to recolorization to improve (e.g., optimize) runtime speed of the recolorization process by, among other things, reducing the computational complexity of the recolorization. Additionally, the transformations applied to images by the preprocessing component 402 enable a user to initiate a recolorization process on a region of interest in an image with only a single stroke (e.g., scribble) applied to the image. For purposes of this disclosure, a "stroke" may comprise a contoured mark such as a scribble applied over the image through appropriate input by the user. Accordingly, a "single" stroke may comprise a single continuous (e.g., uninterrupted) contoured mark applied to the image through appropriate input by the user. To enable a user to initiate the recolorization process using the single stroke, the preprocessing component 402 is configured generate an expanded mask by expanding the single stroke provided by the user, and using the expanded stroke mask, the preprocessing component 402 determines a precise boundary of the region of interest. In some instances, the region of interest may include a target object for recolorization (e.g., a specific object in the image that is to be recolored). The precise boundary of the region of interest is provided as input to the recolorization component 406, which performs the recolorization (e.g., recoloring) of the region of interest image.

In processing an image for recolorization, the preprocessing component 402 may work in conjunction with the scaling component 404, which is configured to resize images (e.g., upsampling and downsampling). For example, prior to recolorization, the scaling component 404 may be utilized to downsample the region of interest in an image to reduce the computational complexity involved in recolorizing the region, thereby increasing the speed with which the recolorization may be performed. Once the region of interest has been recolorized, the post-processing component 408 may work in conjunction with the scaling component 404 to upsample the region of interest to return it to the resolution of the original image. In resizing (e.g., scaling) images, the scaling component 404 may use one of a number of different known scaling techniques or algorithms (e.g., nearest-neighbor interpolation, bilinear algorithms, and bicubic algorithms. Sinc resampling, Lanczos resampling, box sampling, Mipmap, Fourier transform, edge-directed interpolation, hqx, vectorization, or deep convolutional neural networks).

The recolorization component 406 is configured to recolorize (e.g., swap colors) regions of interest in images. The boundary of the region of interest determined by the preprocessing component 402 is provided as input to the recolorization component 406. The recolorization component 406 utilizes a form of graphical model inference to recolorize the region of interest while pixels in the image outside the region of interest are unchanged. Pixels inside the region of interest (but not on the single stroke) are treated as unknowns, and the recolorization component 406 uses graphical model inference to solve for them in light of the constraint that the colors of neighboring pixels with similar luminance must be similar as well. The result of this process is a recolorized image where an original color of the region of interest has been replaced with an alternative color specified by the user.

The post-processing component 408 is responsible for processing an image after recolorization to improve the quality thereof. For example, the combination of downsampling the region of interest prior to recolorization and upsampling the region of interest after recolorization may introduce blur into the recolorized image. To correct the blur, the post-processing component 408 combines the luminance channel of the original resolution region of interest with the U/V (or Cb Cr) chromatic channels of the upsampled region of interest to generate a clearer recolorization result.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the image processing system 208 may physically include an arrangement of one or more processors 410 (e.g., a subset of or among one or more processors of a machine) configured to perform the operations described herein for that component. As another example, any component of the image processing system 208 may include software, hardware, or both, that configure an arrangement of the one or more processors 410 to perform the operations described herein for that component. Accordingly, different components of the image processing system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to FIGS. 5-8.

FIGS. 5-8 are flow charts illustrating operations of the image processing system 208 in performing an example method 500 for digital image editing, according to some embodiments. The method 500 may be embodied in computer-readable instructions for execution by one or more processors such that the operations of the method 500 may be performed in part or in whole by the functional components of the image processing system 208; accordingly, the method 500 is described below by way of example with reference thereto. However, it shall be appreciated that at least some of the operations of the method 500 may be deployed on various other hardware configurations and the method 500 is not intended to be limited to the image processing system 208.

At operation 505, the image processing system 208 causes presentation of an image on a display of the client device 102. The image processing system 208 may accesses the image from a memory of the client device 102 or from the messaging server system 108. The image may be displayed within or as part of a user interface provided by the messaging client application 104 for presentation on the client device 102, and in some instances, the image may be captured by the client device 102. The user interface may include one or more selectable icons that allow a user of the client device 102 to access various image editing functionality. For example, the user interface may include a selectable icon that allows the user to recolorize regions of the image (e.g., swap colors of the regions).

At operation 510, the image processing system 208 receives user input that includes a single stroke (e.g., a scribble) drawn on the image by the user of the client device 102. The single stroke comprises a single contoured mark. In some instances, the stroke may be drawn over a particular object depicted in the image, which is referred to as the "target object." The user input may further include a color for the stroke specified by the user using elements of the user interface. The user may provide the user input by selecting the appropriate icon from the user interface, using an input element provided by the user interface to specify the color, and tracing a scribble on the image through appropriate interaction with an input device of the client device 102 (e.g., using a finger to draw the scribble on a touch screen of the client device 102 without allowing the finger). For purposes of clarity in describing the method 500, the image on which the user provides the stroke may be referred to as the "original image."

At operation 515, the preprocessing component 402 expands the single stroke drawn on the image to generate an expanded stroke mask. The expanding of the single stroke may include user contour points of the single stroke as seed points in a breadth-first search, and propagating the stroke to other neighboring pixel points based on their Red, Green, Blue (RGB) color space value differences. In an example, the expanding of the single stroke may include applying a flood fill algorithm to the image using the contour points of the stroke as seed points, where the target color for the flood fill algorithm is set based on a threshold color difference to the user-specified color of the stroke, which is the replacement color in the context of the flood fill algorithm. Further details of the operation 515 are discussed below in reference to FIG. 6.

At operation 520, the preprocessing component 402 refines the expanded stroke mask to determine a precise boundary (e.g., a more precise boundary) of a region of interest in the image. The region of interest in the image is the region in the image that is to be recolorized (e.g., replaced with the user-specified color) based on the user input, which may include the target object in instances in which the stroke is drawn over an object.

The refining of the expanded stroke mask may include computing a minimum enclosing rectangle (or other polygon) for the expanded stroke mask and applying a Graph Cut algorithm to the image using the minimum enclosing rectangle as input. As will be discussed in further detail below in reference to FIG. 6, the application of the Graph Cut algorithm may include applying a label to each pixel in the image based on whether the pixel is similar to foreground object or a background object where the minimum enclosing rectangle is used to define the foreground and background (e.g., objects within the rectangle are considered in the foreground and objects outside of the rectangle are considered in the background).

At operation 525, the recolorization component 406 recolorizes the region of interest in the image. In recolorizing the region of interest, the recolorization component 406 replaces an original color of at least a portion of the region of interest with an alternative color—the user-specified color. For example, the recolorization component 406 may replace an original color of a target object with the user-specified color. The result of the recolorizing of the region of interest is a recolorized image.

In recolorizing the region of interest, the recolorization component 406 may utilize one of many known image recolorizing techniques. For example, the recolorization component 406 may apply a form of graphical model inference where pixels within the region of interest defined by the precise boundary are treated as unknowns and the recolorization component 406 uses graphical model inference to solve for the unknown pixels with the constraint that neighboring pixels in space-time that have similar intensities (e.g., luminance) are painted with the same color (e.g., the user-specified color). This constraint leads to a global optimization problem that can be solved efficiently using standard techniques (e.g., a quadratic cost function). In this manner, the recolorization component 406 performs color propagation in the color channels of the image while using the luminance channel as reference.

Consistent with some embodiments, the recolorization component 406 may perform processing in the YUV color space where Y is the monochromatic luminance channel (also referred to simply as "intensity"), while U and V are the chrominance channels, encoding the color. The recolorization component 406 may utilize an algorithm that is given as input an intensity volume $Y(x, y, t)$ and outputs two color volumes $U(x, y, t)$ and $V(x, y, t)$. To simplify notation, boldface letters (e.g., r, s) are used in the following discussion to denote $(x, y, t)$ triplets. Thus, $Y(r)$ is the intensity of a particular pixel.

As mentioned above, the recolorization component 406 performs recolorization processing with the imposed constraint that two neighboring pixels r, s should have similar colors if their intensities are similar. In this manner, the recolorization component 406 may minimize the difference between the color $U(r)$ at pixel r and the weighted average of the colors at neighboring pixels:

$$J(U) = \sum_r \left( U(r) - \sum_{s \in N(r)} w_{rs} U(s) \right)^2$$

where $w_{rs}$ is a weighting function that sums to one, large when $Y(r)$ is similar to $Y(s)$, and small when the two intensities are different.

In some embodiments, the following weighting function, which is based on the squared difference between the two intensities, may be employed:

$$w_{rs} \propto e^{-(Y(r)-Y(s))^2/2\sigma_r^2}$$

In other embodiments, an alternative weighting function that is based on the normalized correlation between the two intensities may be employed:

$$w_{rs} \propto 1 + \frac{1}{\sigma_r^2}(Y(r) - \mu_r)(Y(s) - \mu_r)$$

where $\mu_r$ and $\sigma_r$ are the mean and variance of the intensities in a window around r.

The correlation affinity may be derived from assuming a local linear relation between color and intensity. Formally, the recolorization component 406 assumes that the color at a pixel $U(r)$ is a linear function of the intensity $Y(r)$: $U(r) = a_i Y(r) + b_i$ and the linear coefficients $a_i; b_i$ are the same for all pixels in a small neighborhood around r.

The notation $r \in N(s)$ denotes the fact that r and s are neighboring pixels. In a single frame, two pixels are considered neighbors if their image locations are nearby. Given a set of locations $r_i$ where one or more colors are specified by the user $u(r_i) = u_i$, $v(r_i) = v_i$ the recolorization component 406 minimizes $J(U)$. $J(V)$ subject to these constraints. Since the cost functions are quadratic and the constraints are linear, this optimization problem yields a large, sparse system of linear equations, which may be solved using a number of standard methods.

At operation 530, the image processing system 208 causes presentation of the recolorized image on the client device 102. The recolorized image is an edited version of the original image where the original color of at least a portion of the region of interest has been replaced with an alternative color—the user-specified color. For example, the recolorized image may include a target object whose original color has been swapped to the user-specified color.

Figure 6:
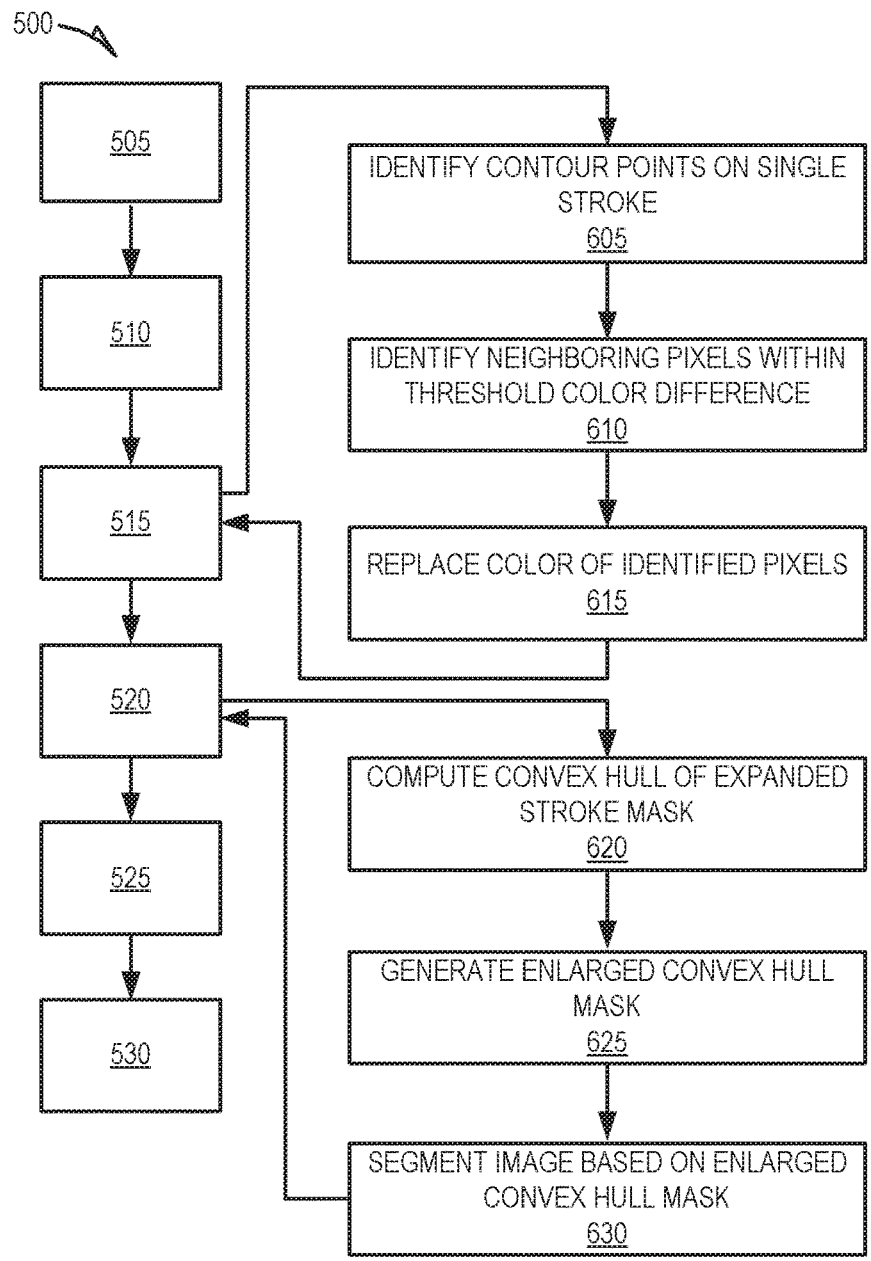

As shown in FIG. 6, the method 500 may, in some embodiments, also include operations 605, 610, 615, 620, 625, and 630. The operations 605, 610, and 615 may be performed as part of operation 515 (e.g., as sub-operations or sub-routines), in which the preprocessing component 402 expands the single stroke drawn on the image to generate an expanded stroke mask.

At operation 605, the preprocessing component 402 identifies one or more contour points on the single stroke. A contour point is a location on the stroke. More specifically, the identified contour points may correspond to inflection points along the stroke at which the curvature of the stroke changes direction.

For each pixel of the image corresponding to one of the identified contour points, the preprocessing component 402 identifies, at operation 610, neighboring pixels that have a color (e.g., defined in the RGB color space) within a threshold color difference to the pixel. For example, for a given pixel, the preprocessing component 402 may identify neighboring pixels that are within a 5% color difference to the pixel. For a given contour point, the preprocessing component 402 may identify the neighboring pixels within the threshold color difference by performing a breadth-first search using the pixel corresponding to the contour point as the seed.

At operation 615, the preprocessing component 402 replaces the color of the identified pixels with an alternative color. More specifically, the preprocessing component 402 replaces the color of the identified pixels with the user-specified color of the stroke. The result of operation 615 is the expanded stroke mask that comprises a sparse set of points that include points along the original stroke as well as the neighboring pixels identified at operation 610. Those of ordinary skill in the art may recognize that the operations 610 and 615 may be performed as part of a flood fill algorithm, in which the pixels corresponding to contour points are used as the starting nodes, the target color includes colors within the threshold color difference of the user-specified color, and the replacement color is the user-specified color.

Operations 620, 625, and 630 may be performed as part of the operation 520, in which the preprocessing component 402 refines the expanded stroke mask to determine the precise boundary of the region of interest in the image. At operation 620, the preprocessing component 402 computes a convex hull of the expanded stroke mask. The convex hull represents the smallest convex set that contains the sparse set of points that form the expanded stroke mask. For example, in some instances, the convex hull corresponds to the minimum enclosing rectangle for the sparse set of points that form the expanded stroke mask. The preprocessing component 402 may utilize one of a number of known techniques or algorithms to compute the convex hull of a set of points. In general, the preprocessing component 402 may utilize the following function to compute the convex hull of the expanded stroke mask:

$$Conv(S) = \left\{ \sum_{i=1}^{|S|} \alpha_i x_i \,\middle|\, (\forall i : \alpha_i \geq 0) \wedge \sum_{i=1}^{|S|} \alpha_i = 1 \right\}$$

Where S represents the sparse set of points that form the expanded stroke mask. In the function presented above, each point $x_i$ in S is assigned a weight or coefficient $\alpha_i$ in such a way that the coefficients are all non-negative and sum to one, and these weights are used to compute a weighted average of the points. For each choice of coefficients, the resulting convex combination is a point in the convex hull, and the whole convex hull can be computed by selecting coefficients in all possible ways.

At operation 620, the preprocessing component 402 generates an enlarged convex hull mask by enlarging the convex hull by a predetermined amount. For example, the preprocessing component 402 may dilate the convex hull by 20%, thereby enlarging a size (e.g., area) of the convex hull.

At operation 625, the preprocessing component 402 segments the image based on the enlarged convex hull mask. In doing so, the preprocessing component 402 assigns a label to each pixel in the image based in the enlarged convex hull mask. More specifically, the preprocessing component 402 assigns a label to each pixel in the image based on whether the pixel is similar to foreground object (e.g., the target object) or a background object. In this case, the enlarged convex hull mask is used to define the foreground and background. In particular, objects within the rectangle are considered in the foreground and objects outside of the rectangle are considered in the background. The labels applied to the pixels indicate whether the pixel is similar to a foreground object or a background object. The result of the application of the labels to the pixels is a precise boundary that defines a region of interest. In this case, pixels with labels corresponding to similarity to a foreground image establish the boundary of the region of interest.

One of ordinary skill in the art may recognize that operation 625 may correspond to or be accomplished by utilizing a Graph Cut algorithm, which is an image segmentation method based on graph cuts. A bounding box, in this case the enlarged convex hull mask, is provided as input to the Graph Cut algorithm, and the algorithm estimates the color distribution of a target object within the bounding box and that of the background using a Gaussian mixture model. The color distribution estimates are used to construct a Markov random field over the pixel labels, with an energy function that prefers connected regions having the same label, and running a graph-cut-based optimization to infer their values. This procedure may be repeated until convergence is achieved.

Figure 7:
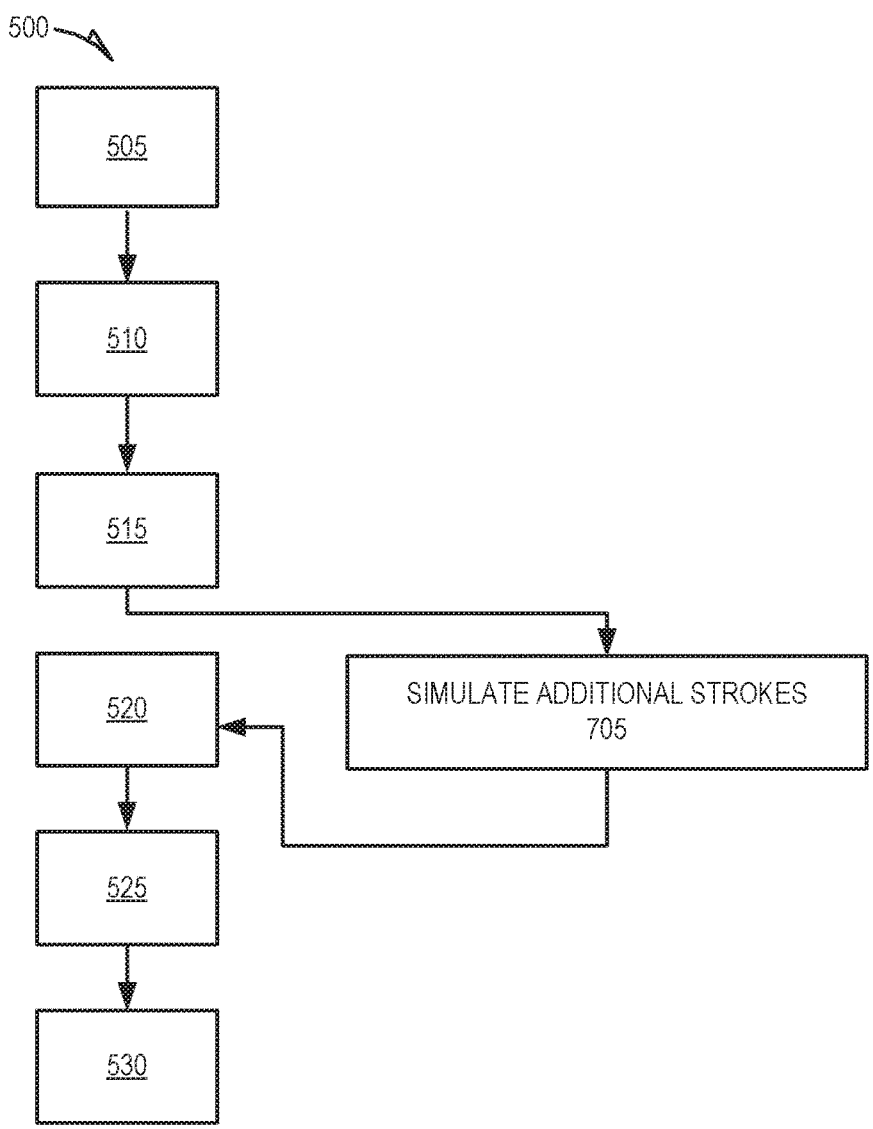

As shown in FIG. 7, the method 500 may also include operation 705, which may be performed subsequent to operation 520, in which the preprocessing component 402 refines the expanded stroke mask to determine the precise boundary of the region of interest in the image. At operation 705, the preprocessing component 402 simulates one or more additional strokes. The simulating of the one or more additional strokes on the image comprises performing bilateral filtering on the image to remove high frequency edges; performing edge detection on the image to generate an edge map; and dilating the edge map such that the edges are thickened.

Figure 8:
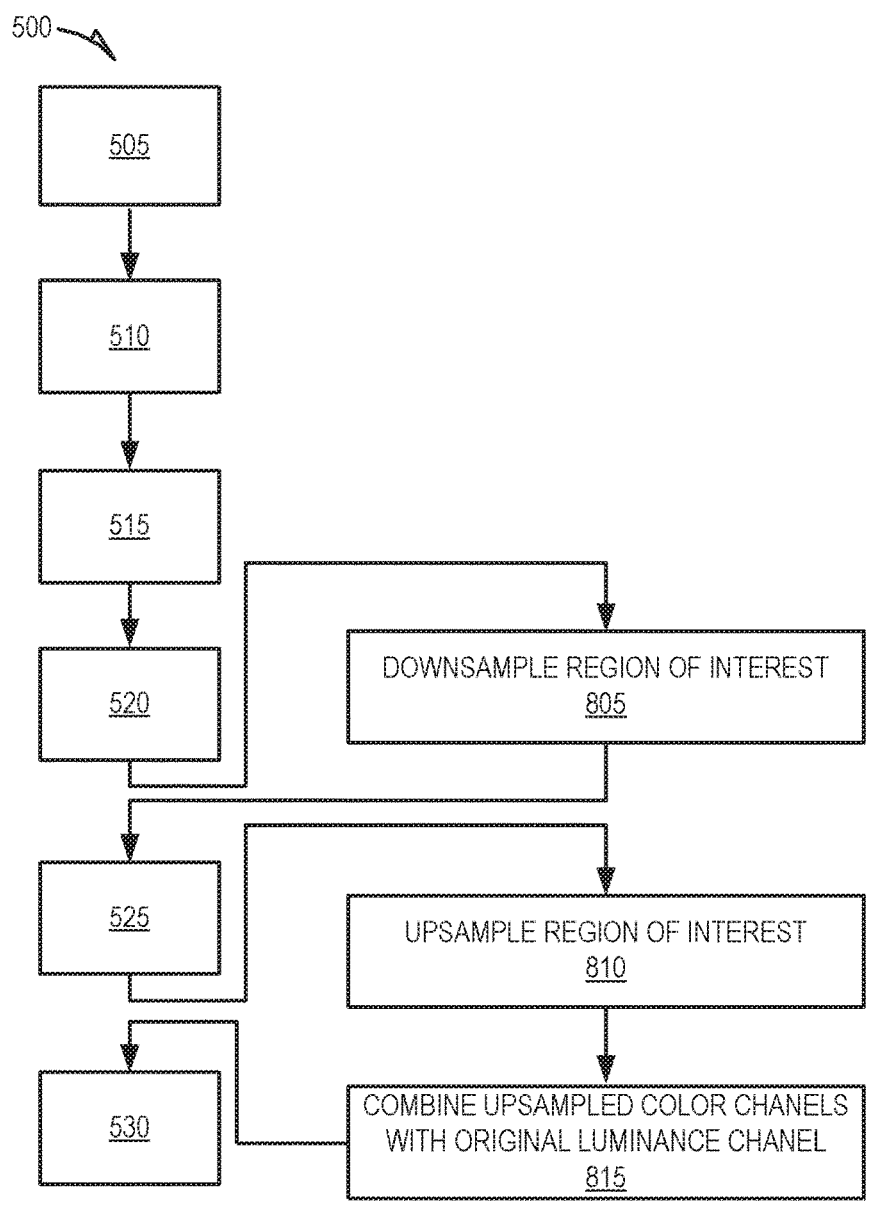

As shown in FIG. 8, the method 500 may, in some embodiments, include operations 805, 810, and 815. Operation 805 may be performed prior to operation 525, in which the recolorization component 406 recolorizes the region of interest in the image. At operation 805, the sampling rate conversion component 404 downsamples the region of interest. Downsampling the region of interest prior to recolorizing results in an improvement to the speed with which the region of interest is recolorized because the downsampling reduces the computational complexity involved in recolorizing the region of interest.

Operations 810 and 815 may be performed subsequent to operation 525, in which the recolorization component 406 recolorizes the region of interest in the image. At operation 810, the sampling rate conversion component 404 upsamples the recolorized region of interest. The sampling rate conversion component 404 upsamples the recolorized region of interest to return it to the resolution of the original image.

In some instances, the downsampling of the region of interest prior to recolorizing and upsampling after the recolorizing causes the recolorized image to be blurred compared to the original image. To address the blurriness of the recolorized image after upsampling, the post-processing component 408, at operation 815, combines color channels of the recolorized image with the luminance channel of the original image. In doing so, the post-processing component 408 may convert the RGB color space definition of both the original and recolorized images to the YCbCr color space using a mathematical coordinate transformation. In the YCbCr color space, the luminance channel corresponds to the "Y" channel, and the "Cb" and "Cr" chrominance channels correspond to the color channels. Thus, in combining the color channels of the recolorized image with the luminance channel of the original image, the post-processing component 408 merges the "Y" channel of the original image with the "Cb" and "Cr" channels of the recolorized image into a three-dimensional array, which forms a new, clearer (e.g., unblurred) version of the recolorized image.

Figure 9A:
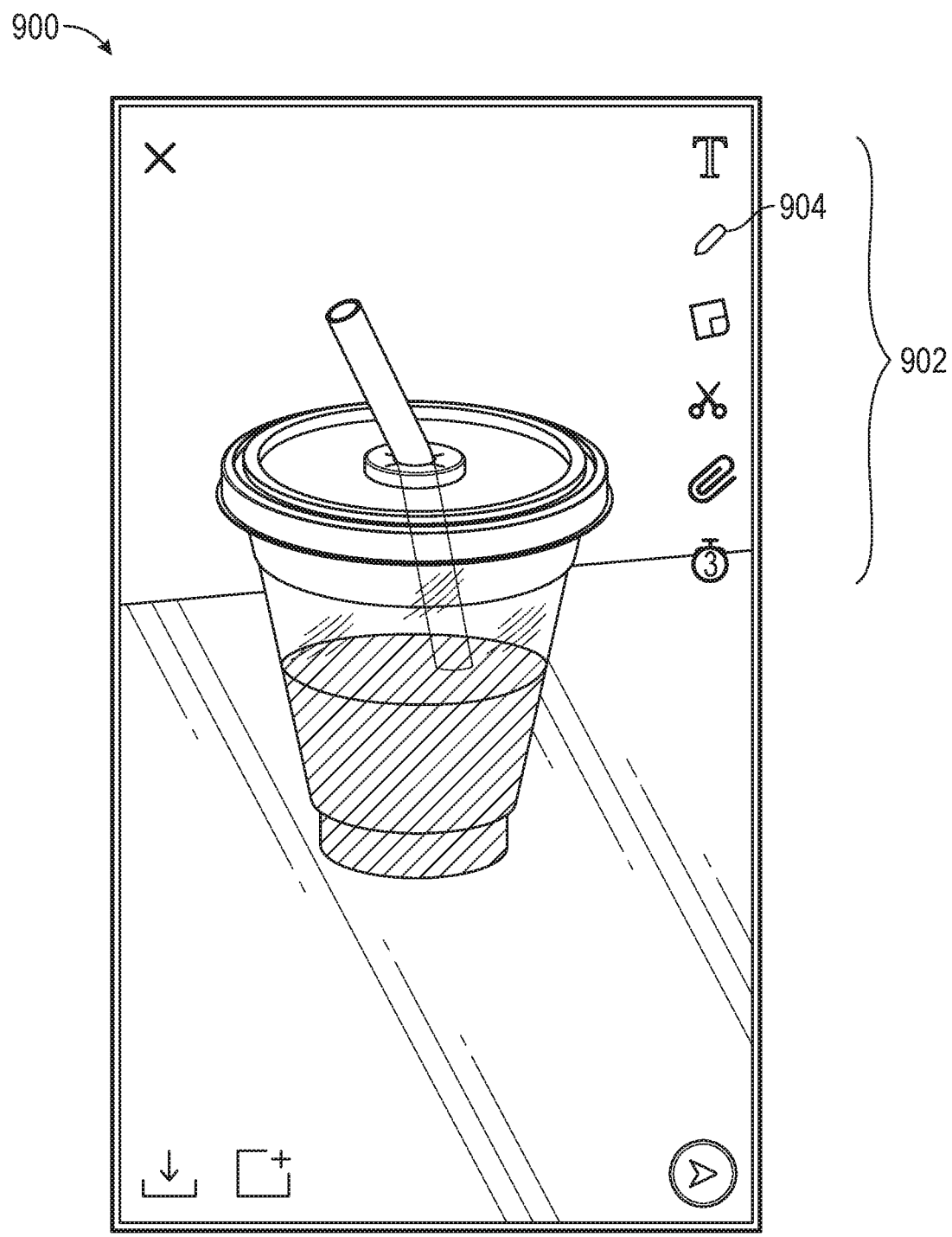
FIGS. 9A, 9B, 9C, and 9D are interface diagrams illustrating aspects of user interfaces provided by the messaging system, according to some embodiments.

FIGS. 9A, 9B, 9C, and 9D are interface diagrams illustrating aspects of user interfaces provided by the messaging system 100, according to some embodiments. In particular, FIG. 9A illustrates an original image 900 that may be captured by and presented within a user interface display on the client device 102. The user interface includes a set of icons 902, each of which corresponds to a particular image editing functionality provided to a user of the client device 102. For example, selection of icon 904 allows a user to recolorize regions of the image 900.

Figure 9B:
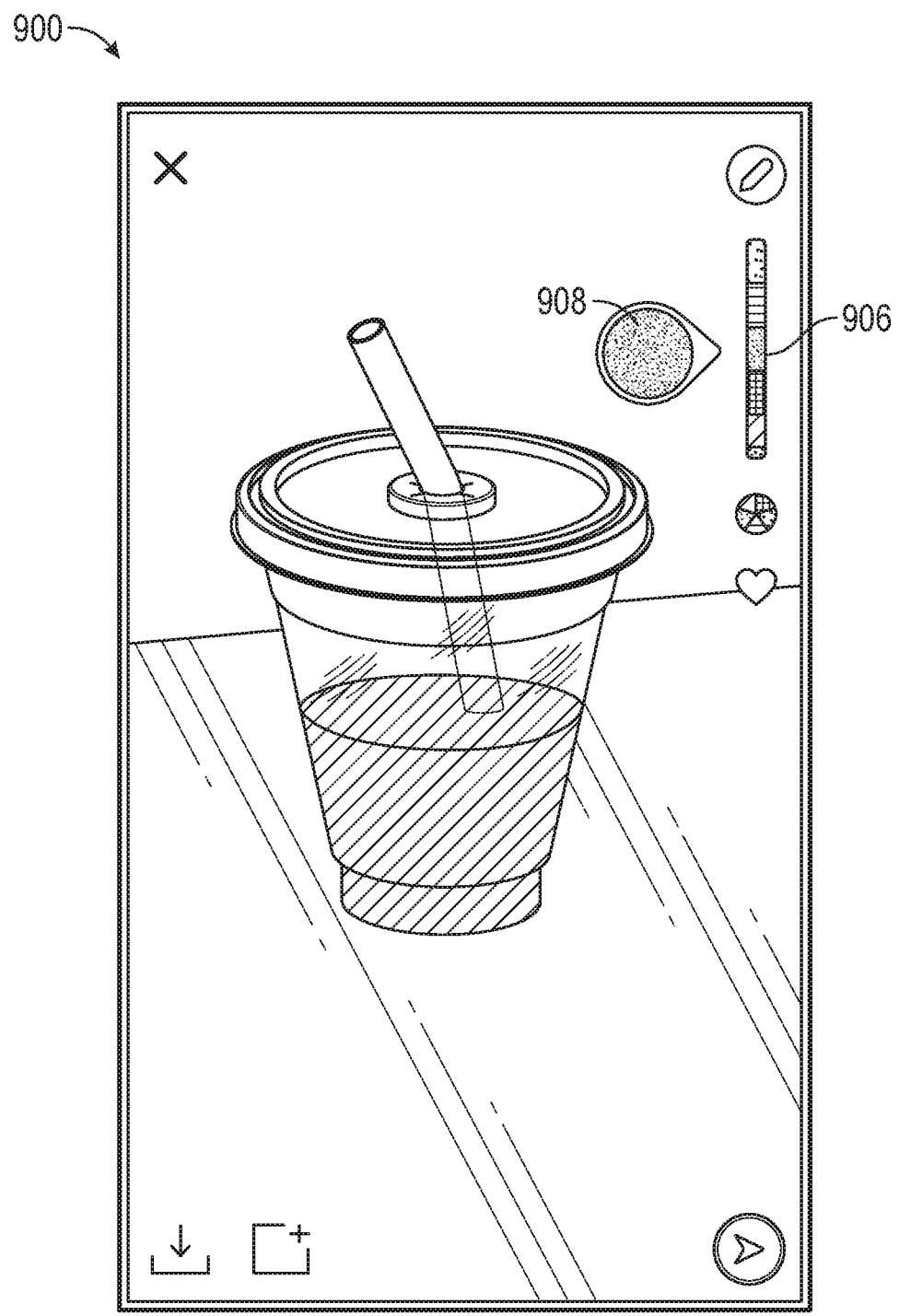

FIG. 9B illustrates a graphical input element 906 of the user interface from which a user may specify a color to use in recolorizing regions (e.g., objects) within the image 900.

In this example, the user has specified color 908. The graphical input element 906 may be provided in response to user selection of the icon 904.

Figure 9C:
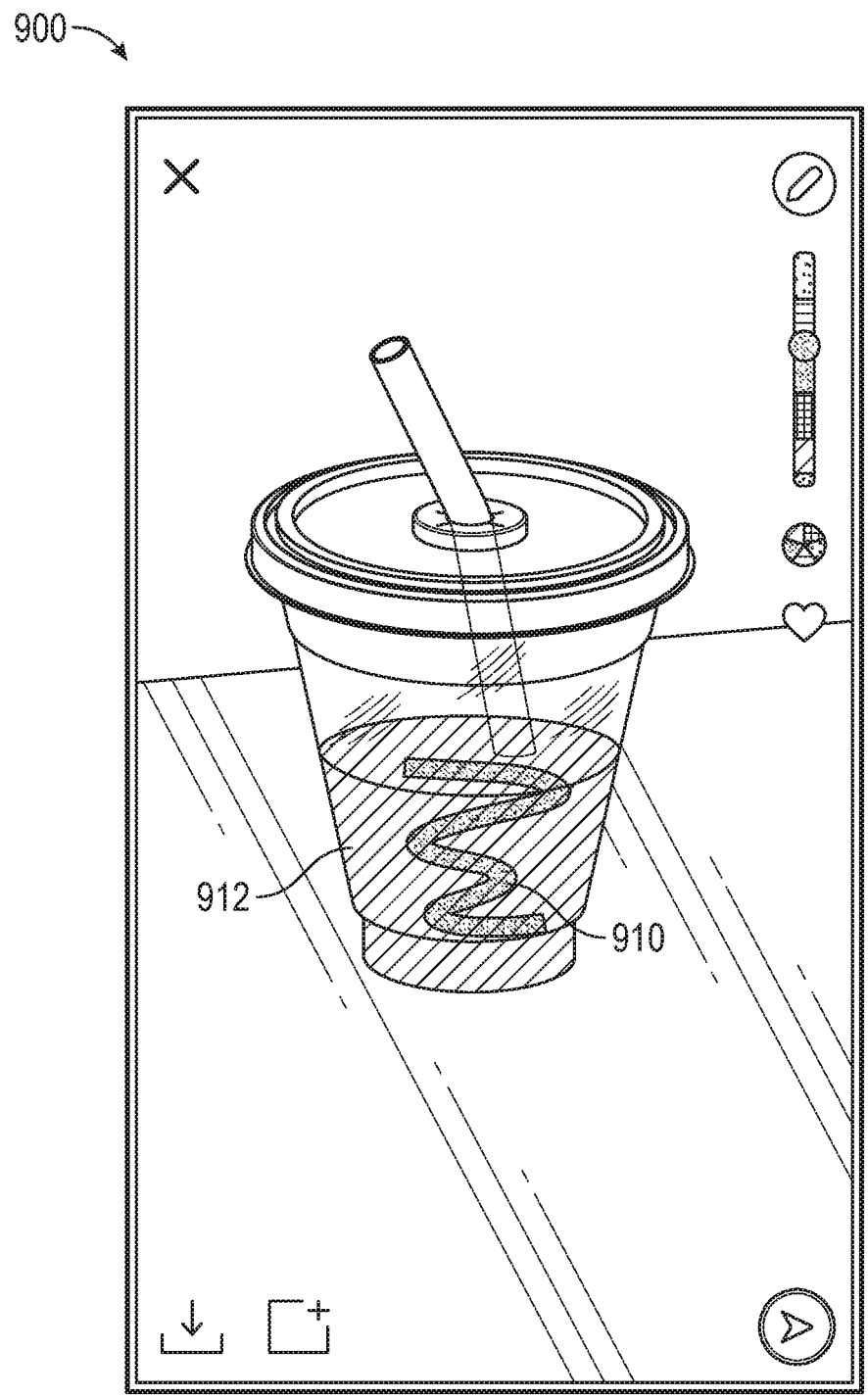

FIG. 9C illustrates a single stroke 910 drawn on the image 900 by the user. The user may create the stroke 910, for example, by moving his or her finger over the image 900 on the touch screen of the client device 102. The stroke 910 is drawn over a target object 912, which in this case corresponds to liquid in a cup. Further, as shown, the color of the stroke 910 is the user-specified color 908.

Figure 9D:
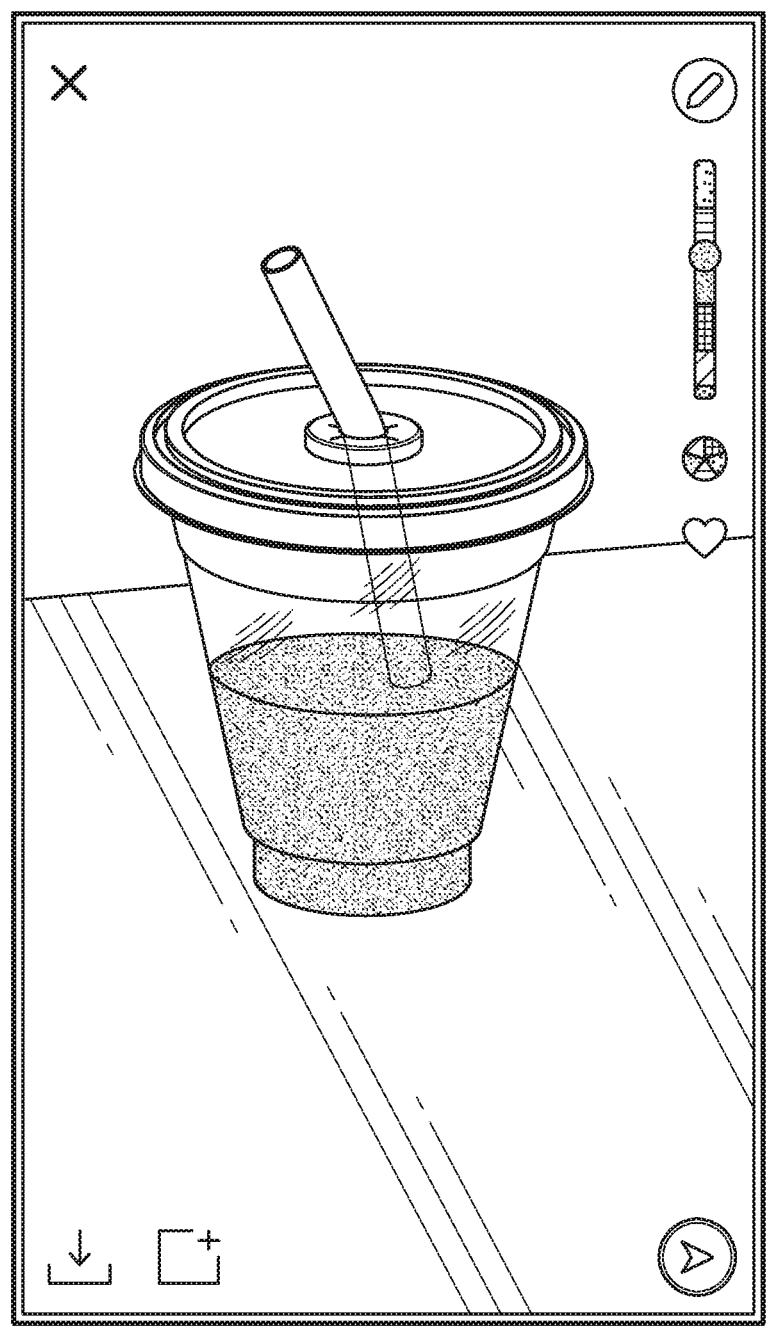

FIG. 9D illustrates a modified image 950 that may be presented within the user interface display on the client device 102. The modified image 950 is an edited version of the original image 900 generated by applying the techniques described herein to the target object 912 that corresponds to the stroke 910. More specifically, in the modified image 950, the original color of the target object 912 (the liquid) has been recolorized in accordance with the user-specified color 908. In other words, the original color of the target object 912 corresponding to the stroke 910 has been replaced with the user-specified color 908.

Software Architecture

Figure 10:
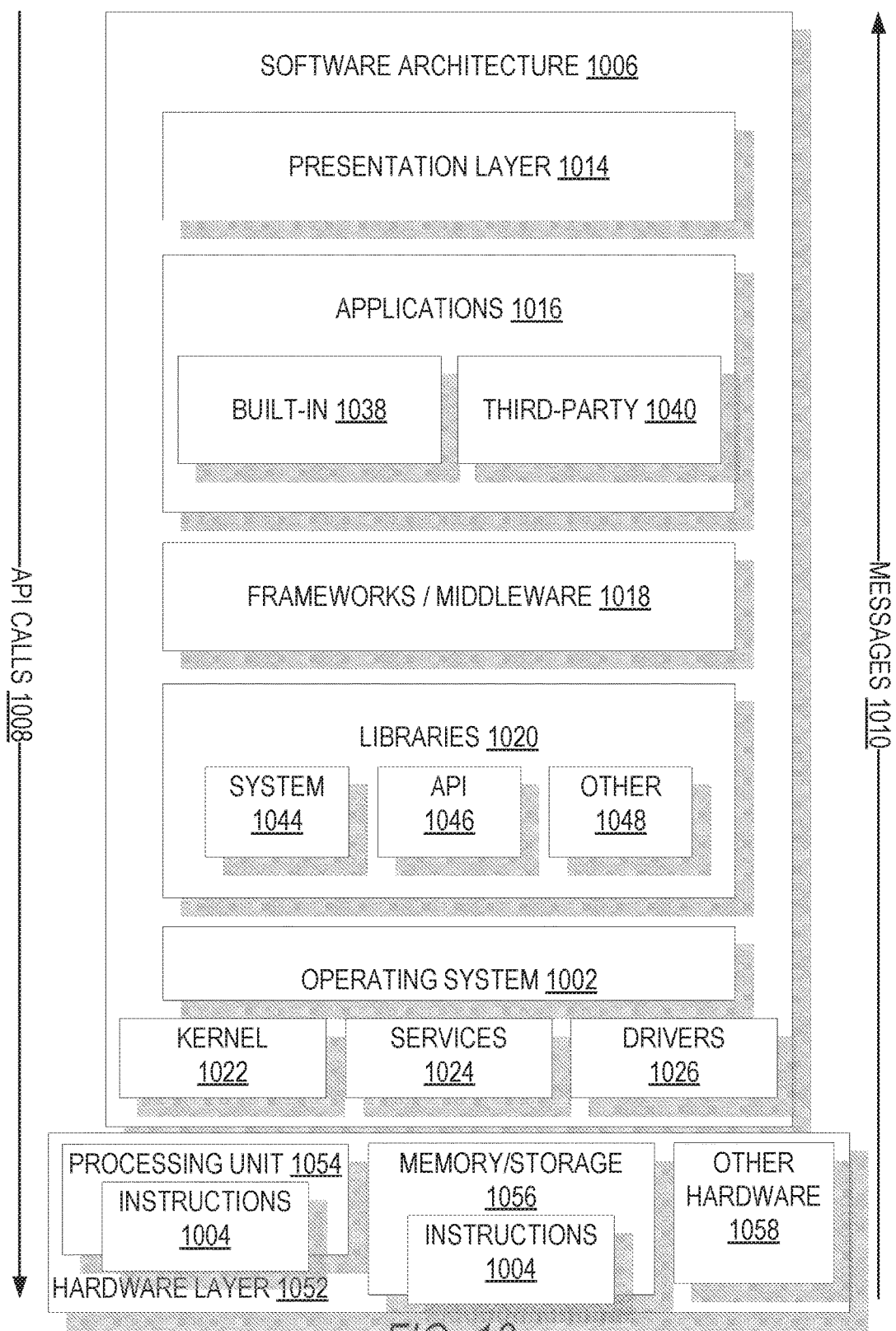
FIG. 10 is a block diagram illustrating a representative software architecture, which may be used in conjunction with various hardware architectures herein described.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as a machine 1100 of FIG. 11 that includes, among other things, processors 1104, memory/storage 1106, and I/O components 1118. A representative hardware layer 1052 is illustrated and can represent, for example, the machine 1100 of FIG. 11. The representative hardware layer 1052 includes a processing unit 1054 having associated executable instructions 1004. The executable instructions 1004 represent the executable instructions of the software architecture 1006, including implementation of the methods, components, and so forth described herein. The hardware layer 1052 also includes memory and/or storage 1056, which also have the executable instructions 1004. The hardware layer 1052 may also comprise other hardware 1058.

As used herein, the term "component" may refer to a device, a physical entity, or logic having boundaries defined by function or subroutine calls, branch points. APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 10, the software architecture 1006 may be conceptualized as a stack of layers where each layer provides particular functionality. For example, the software architecture 1006 may include layers such as an operating system 1002, libraries 1020, frameworks/middleware 1018, applications 1016, and a presentation layer 1014. Operationally, the applications 1016 and/or other components within the layers may invoke API calls 1008 through the software stack and receive a response as messages 1010. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than by interfacing directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. The third-party applications 1040 may include an application developed using the ANDROID™ or IOS™ software development kit (SDK) by an entity other than the vendor of the particular platform, and may be mobile software running on a mobile operating system such as IOS™, ANDROID™. WINDOWS® Phone, or other mobile operating systems. The third-party applications 1040 may invoke the API calls 1008 provided by the mobile operating system (such as the operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as the presentation layer 1014. In these systems, the application/component "logic" can be separated from the aspects of the application/component that interact with a user.

Exemplary Machine

Figure 11:
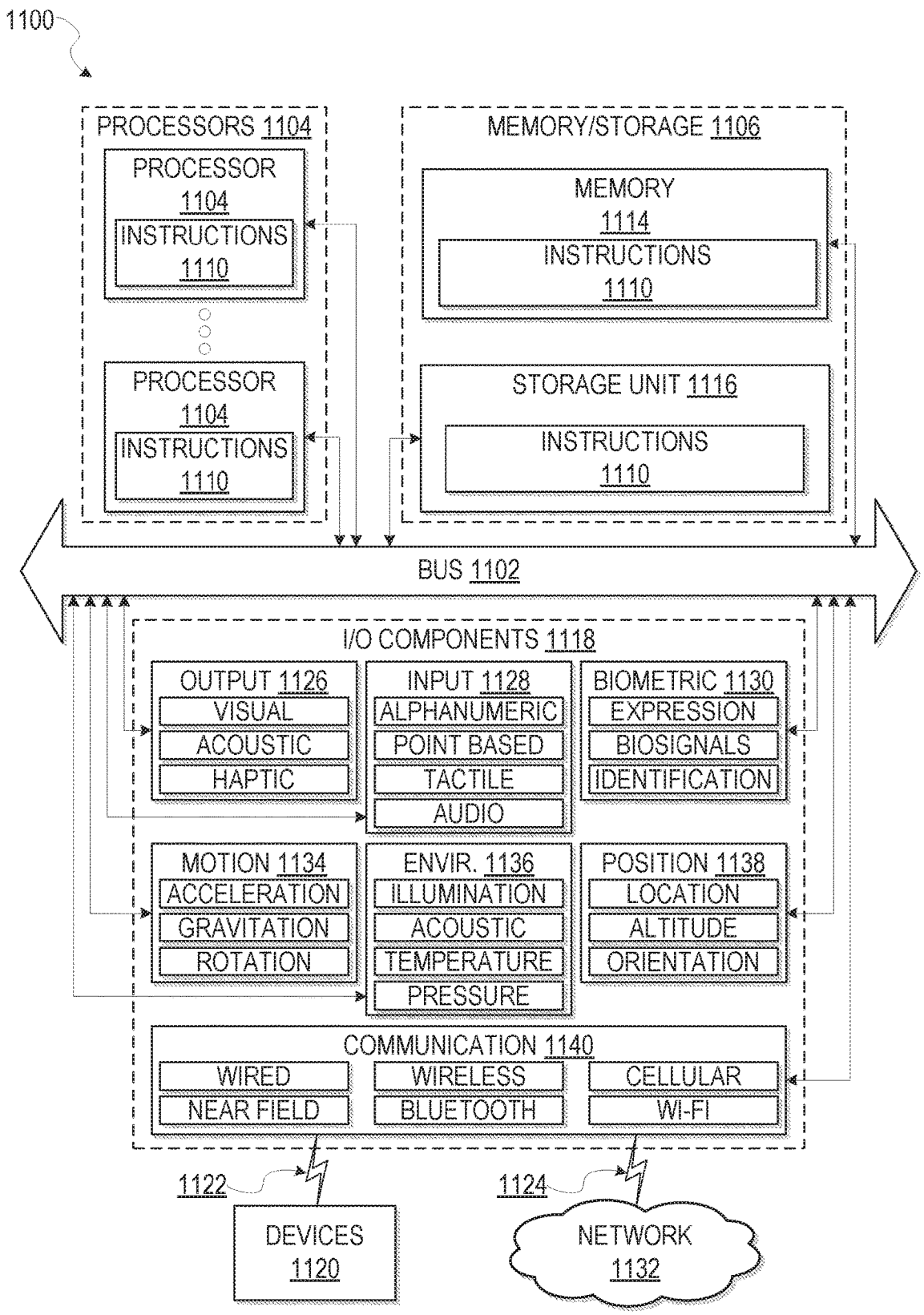
FIG. 11 is a block diagram illustrating components of a machine, according to some exemplary embodiments, able to read instructions from a machine-readable medium (e.g., a machine-readable storage medium) and perform any one or more of the methodologies discussed herein.

FIG. 11 is a block diagram illustrating components (also referred to herein as "modules") of a machine 1100, according to some exemplary embodiments, able to read instructions from a machine-readable medium (e.g., a machine-readable storage medium) and perform any one or more of the methodologies discussed herein. Specifically. FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of the processors 1104 are examples of machine-readable media.

As used herein, the term "machine-readable medium," "computer-readable medium." or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1118 may include a wide variety of components to provide a user interface for receiving input, providing output, producing output, transmitting information, exchanging information, capturing measurements, and so on. The specific I/O components 1118 that are included in the user interface of a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various exemplary embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1128 may also include one or more image-capturing devices, such as a digital camera for generating digital images and/or video.

In further exemplary embodiments, the I/O components 1118 may include biometric components 1130, motion components 1134, environment components 1136, or position components 1138, as well as a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via a coupling 1124 and a coupling 1122 respectively. For example, the communication components 1140 may include a network interface component or other suitable device to interface with the network 1132. In further examples, the communication components 1140 may include wired communication components, wireless communication components, cellular communication components, Near Field Communication (NFC) components. Bluetooth® components (e.g., Bluetooth® Low Energy). Wi-Fi® components, and other communication components to provide communication via other modalities. The devices 1120 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, SNAPCHAT. INC., All Rights Reserved.

What is claimed is:

1. A system comprising:
    a processor;
    a user interface coupled to the processor and including a display;
    a communication module coupled to the processor; and
    memory coupled to the processor and storing instructions that, when executed by the processor, cause the system to perform operations comprising:
        causing presentation of an image on a client device;
        receiving user input including a single stroke drawn on the image;
        expanding the single stroke drawn on the image to generate an expanded stroke mask;
        refining the expanded stroke mask to determine a precise boundary that defines a region of interest in the image;
        recolorizing the region of interest on the image, the recolorizing including replacing an original color of the region of interest with an alternative color, the recolorizing of the region of interest resulting in a recolorized image; and
        causing presentation of the recolorized image on the client device.

2. The system of claim 1, wherein the expanding of the single stroke comprises:
    identifying one or more contour points on the single stroke; and
    applying a flood fill algorithm to the image using the one or more contour points as seeds, the applying of the flood fill algorithm resulting in the expanded stroke mask.

3. The system of claim 1, wherein the expanding of the single stroke comprises:
    identifying one or more contour points on the single stroke;
    for each pixel of the image corresponding to the one or more contour points of the single stroke, identifying connected pixels having a color within a threshold color difference to the pixel; and
    replacing the color of connected pixels with a user-specified color of the single stroke, the replacing of the color of the connected pixels resulting in the expanded stroke mask.

4. The system of claim 1, wherein the refining of the expanded stroke mask comprises:
    computing a convex hull of the expanded stroke mask;
    dilating the convex hull by a predetermined amount to generate an enlarged convex hull mask; and
    segmenting the image based on the enlarged convex hull mask.

5. The system of claim 4, wherein the segmenting of the image comprises applying a graph cut algorithm to the image.

6. The system of claim 4, wherein the segmenting of the image comprises assigning a label to each pixel in the image based on a similarity to one or more objects in a foreground of the image defined by the enlarged convex hull mask, the assigning of the label to each pixel in the image resulting in the precise boundary that defines the region of interest.

7. The system of claim 1, wherein the operations further comprise:
prior to recolorizing the region of interest of the image, downsampling the region of interest; and
subsequent to recolorizing the region of interest, upsampling the recolorized region of interest.

8. The system of claim 7, wherein the operations further comprise:
combining color channels of the upsampled region of interest with an original luminance channel of the region of interest.

9. The system of claim 1, wherein the refining of the expanded stroke mask further comprises simulating one or more additional strokes on the image.

10. The system of claim 7, wherein the simulating of the one or more additional strokes on the image comprises:
performing bilateral filtering on the image to remove high-frequency edges;
performing edge detection on the image to generate an edge map; and
dilating the edge map such that the edges are thickened.

11. The system of claim 1, wherein:
the user input further includes a user-specified color; and
the recolorization of the region of interest comprises replacing the original color of the region of interest with the user-specified color.

12. The system of claim 11, wherein the single stroke comprises a single contoured mark.

13. A method comprising:
causing presentation of an image on a client device;
receiving user input including a single stroke drawn on the image;
expanding the single stroke drawn on the image to generate an expanded stroke mask;
refining the expanded stroke mask to determine a precise boundary that defines a region of interest in the image;
recolorizing the region of interest on the image, the recolorizing including replacing an original color of the region of interest with an alternative color, the recolorizing of the region of interest resulting in a recolorized image; and
causing presentation of the recolorized image on the client device.

14. The method of claim 13, wherein the expanding of the single stroke comprises:
identifying one or more contour points on the single stroke;
for each pixel of the image corresponding to the one or more contour points of the single stroke, identifying connected pixels having a color within a threshold color difference to the pixel; and
replacing the color of connected pixels with a user-specified color of the single stroke, the replacing of the color of the connected pixels resulting in the expanded stroke mask.

15. The method of claim 13, wherein the refining of the expanded stroke mask comprises:
computing a convex hull of the expanded stroke mask;
dilating the convex hull by a predetermined amount to generate an enlarged convex hull mask; and
segmenting the image based on the enlarged convex hull mask.

16. The method of claim 15, wherein the segmenting of the image comprises assigning a label to each pixel in the image based on a similarity to one or more objects in a foreground of the image defined by the enlarged convex hull mask, the assigning of the label to each pixel in the image resulting in the precise boundary that defines the region of interest.

17. The method of claim 13, wherein the operations further comprise:
prior to recolorizing the region of interest of the image, downsampling the region of interest;
subsequent to recolorizing the region of interest, upsampling the recolorized region of interest; and
combining color channels of the upsampled region of interest with an original luminance channel of the region of interest.

18. The method of claim 13, further comprising simulating one or more additional strokes on the image, the simulating of the one or more additional strokes on the image comprising:
performing bilateral filtering on the image to remove high-frequency edges;
performing edge detection on the image to generate an edge map; and
dilating the edge map such that the edges are thickened.

19. A non-transitory computer-readable medium storing instructions that, when executed by a computer system, cause the computer system to perform operations comprising:
causing presentation of an image on a client device;
receiving user input including a single stroke drawn on the image;
expanding the single stroke drawn on the image to generate an expanded stroke mask;
refining the expanded stroke mask to determine a precise boundary that defines a region of interest on the image;
recolorizing the region of interest on the image, the recolorizing including replacing an original color of the region of interest with an alternative color, the recolorizing of the region of interest resulting in a recolorized image; and
causing presentation of the recolorized image on the client device.

20. The non-transitory computer-readable medium of claim 19, wherein the operations further comprise:
prior to recolorizing the region of interest on the image, downsampling the region of interest;
subsequent to recolorizing the region of interest, upsampling the recolorized region of interest; and
combining color channels of the recolorized region of interest with an original luminance channel of the region of interest.

* * * * *